United States Patent
Sharma et al.

(10) Patent No.: US 12,052,254 B2
(45) Date of Patent: *Jul. 30, 2024

(54) ESCALATING USER PRIVILEGES IN CLOUD COMPUTING ENVIRONMENTS

(71) Applicant: Google LLC, Mountain View, CA (US)

(72) Inventors: Manoj Sharma, Sunnyvale, CA (US); Choudhury Sarada Prasanna Nanda, Fremont, CA (US); Ilya Beyer, Mill Valley, CA (US); Maurilio Cometto, Redwood City, CA (US)

(73) Assignee: Google LLC, Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/446,751

(22) Filed: Sep. 2, 2021

(65) Prior Publication Data

US 2021/0400051 A1 Dec. 23, 2021

Related U.S. Application Data

(63) Continuation of application No. 16/135,193, filed on Sep. 19, 2018, now Pat. No. 11,128,629.

(51) Int. Cl.
*G06F 21/00* (2013.01)
*G06F 11/34* (2006.01)
*G06F 21/62* (2013.01)
*H04L 9/40* (2022.01)

(52) U.S. Cl.
CPC ........ *H04L 63/102* (2013.01); *G06F 11/3438* (2013.01); *G06F 21/6281* (2013.01); *H04L 63/108* (2013.01); *G06F 2221/2141* (2013.01)

(58) Field of Classification Search
CPC .. H04L 63/102; H04L 63/108; G06F 11/3438; G06F 21/6281; G06F 2221/2141; G06F 11/3476; G06F 21/604
See application file for complete search history.

(56) References Cited

U.S. PATENT DOCUMENTS

| 2006/0143447 | A1* | 6/2006 | Vasishth | H04L 63/102 713/166 |
| 2012/0041844 | A1 | 2/2012 | Shen et al. | |
| 2012/0254946 | A1* | 10/2012 | Fleischman | H04L 63/0823 726/19 |

(Continued)

*Primary Examiner* — Ghazal B Shehni
(74) *Attorney, Agent, or Firm* — Honigman LLP; Brett A. Krueger

(57) ABSTRACT

In one embodiment, a system includes a computing device providing a computing environment including a number of user accounts, where each of the user accounts is assigned specified privileges to execute particular commands or programs, receiving a request to temporarily escalate privileges for one of the user accounts during a specified duration, where the request includes an identifier of the user account, requested privileges, and the specified duration, granting the requested privileges for the specified duration in conjunction with specific restrictions on one or more prohibited activities that are normally permitted for user accounts with the requested privileges, monitoring, during the specified duration, for any indication that the user account has attempted a prohibited activity, detecting an indication that the user account attempted one of the prohibited activities, and initiating an automated remediation corresponding to the indication.

20 Claims, 6 Drawing Sheets

(56) References Cited

U.S. PATENT DOCUMENTS

| | | |
|---|---|---|
| 2013/0086641 A1 | 4/2013 | Mehr et al. |
| 2015/0310195 A1 | 10/2015 | Bailor et al. |
| 2015/0358310 A1* | 12/2015 | Beckhardt .............. H04H 60/80 |
| | | 726/4 |
| 2016/0088000 A1 | 3/2016 | Siva Kumar et al. |
| 2017/0006044 A1* | 1/2017 | Ezra ...................... H04L 63/102 |
| 2017/0161503 A1* | 6/2017 | Seigel ................. H04L 63/1425 |
| 2017/0163650 A1* | 6/2017 | Seigel ................... H04L 63/102 |
| 2017/0295197 A1* | 10/2017 | Parimi .................... H04L 63/10 |
| 2018/0375891 A1* | 12/2018 | Juncker .................. G06F 21/55 |
| 2019/0080081 A1* | 3/2019 | Goodridge .............. G06F 9/445 |

* cited by examiner

ESCALATING USER PRIVILEGES IN CLOUD COMPUTING ENVIRONMENTS

CROSS REFERENCE TO RELATED APPLICATIONS

This U.S. Patent Application is a continuation of, and claims priority under 35 U.S.C. § 120 from, U.S. patent application Ser. No. 16/135,193, filed on Sep. 19, 2018. The disclosure of this prior art application is considered part of the disclosure of this application and is hereby incorporated by reference in its entirety.

TECHNICAL FIELD

This disclosure generally relates to user account management in cloud computing environments.

BACKGROUND

Cloud computing environments may provide access to computing resources such as processors, storage devices, and software as services to client systems via communications networks. Cloud computing environments may provide scalable computing resources, with processor and storage capacity being allocated according to demand and may provide security and privacy to prevent unauthorized access to information. The computing resources may include server computer systems connected via networks, associated data storage devices, and software that implements cloud services, such as infrastructure software for managing cloud resources, and application software that uses cloud resources. Each of the server computer systems may be a node of a network. The cloud's physical resources, such as server computer systems and associated hardware, such as storage devices and network routers, may be located in one or more data centers. A cloud may thus be said to be hosted by one or more data centers.

A cloud computing environment may be categorized as a public cloud or, a private cloud. A public cloud may provide computing resources to the general public via the public Internet (though communications may be encrypted for information privacy). Examples of public clouds include the Microsoft Azure™ cloud computing service provided by Microsoft Corporation, the Amazon Web Services™ cloud computing service provided by Amazon.com Inc., and the Google Cloud Platform™ cloud computing service provided by Google LLC. A private cloud may provide computing resources to only particular users via a private network or the Internet, e.g., to only users who are members of or associated with a particular organization, and may use resources in a data center hosted by, e.g., on the premises of, the particular organization, or resources hosted in a data center at another location, which may be operated by another organization. The public cloud provider's data center(s) may host some or all of the private cloud resources, and the private cloud provider's data center(s) may host some or all of the public cloud resources. As an example, a private cloud may be implemented by a public cloud provider by, for example, creating an Internet-accessible private cloud for which access is restricted to only specific users. As another example, a private cloud may be implemented by an organization using private cloud software on hardware resources (e.g., in a datacenter) hosted by the organization itself (or by other organization). The VMware Cloud™ private cloud software, for example, may be used to implement a private cloud.

Cloud computing resources such as computer systems may be provisioned, e.g., allocated, to clients according to requests received from the clients. For example, a client may request access to a specified number of servers with a specified amount of storage and specified operating system and application software. Cloud providers may provision the resources accordingly and may use visualization techniques to create one or more virtual instances of physical resources such as server computer systems. Each virtual instance may appear, to clients, to be substantially the same as the physical resource, but the virtual instances may be used more efficiently by the cloud provider to fulfill client requests. For example, multiple virtual instances of a physical server may be provided to multiple corresponding users at the same time, and each virtual instance may appear, to its user, to be the same as the physical resource. Virtual instances of a physical server may be created and managed by a hypervisor executing on the physical server. An example hypervisor is the VMware ESXi™ hypervisor provided by VMware Inc. Each virtual instance may be referred to as a virtual machine (VM). An operating system may execute in a virtual machine, and application software may execute in the virtual machine using the operating system.

SUMMARY

In particular embodiments, a computing device associated with a cloud management system may provide a computing environment comprising a plurality of user accounts. Each of the user accounts is assigned specified privileges to execute particular commands or programs. The computing device may receive a request to temporarily escalate privileges for a user account during a specified duration, where the user account is one of the plurality of user accounts. The request may comprise an identifier of the user account, requested privileges, and the specified duration. The computing device may grant the requested privileges for the specified duration in conjunction with specific restrictions on one or more prohibited activities that are normally permitted for user accounts with the requested privileges. The computing device may start a timer for the specified duration upon granting the requested privileges. When the timer expires, the computing device may restore privileges for the user account to the previous privileges assigned to the user account before the escalation of privileges. In particular embodiments, the computing device may receive a request to extend the specified duration to an extended duration. The computing device may determine whether the request is allowable. The computing device may reset the timer for the extended duration if the computing device determined that the request is allowable. In particular embodiments, the request may comprise an identifier for a task that needs to be performed by the user account during the specified duration. The computing device may evaluate whether the requested privileges are required to perform the task and whether temporarily granting the requested privileges to the user account is allowable. The computing device may reject the request if the requested privileges are not required to perform the task or if temporarily granting the requested privileges to the user account is not allowable.

The computing device may, during the specified duration, monitor for any indication that the user account has attempted a prohibited activity by monitoring specified objects and analyzing event logs. Each of the prohibited activities and its corresponding indication that the user account attempted the prohibited activity may be pre-defined. Each indication may signify that the user account touched one of the specified objects or that the user account generated a particular event. The computing device may, in order to monitor the specified objects, schedule a periodic job of inspecting the specified objects. The computing device may determine an interval for the periodic job such that the indication can be detected with a delay less than a threshold. The computing device may detect an indication that the user account touched one of the specified objects if the one of the specified objects was modified by the user account. The computing device may, in order to analyze the event logs, schedule a periodic job of analyzing the event logs. The computing device may determine an interval for the periodic job such that the indication can be detected with a delay less than a threshold. The computing device may detect an indication that the user account generated a particular event if the event logs contain one or more records for the particular event. The computing device may, on detecting an indication that the user account attempted one of the prohibited activities, initiate an automated remediation corresponding to the indication. The automated remediation corresponding to the indication may comprise providing alerts to one or more registered system administrators.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF DRAWINGS

Like reference symbols in the various drawings indicate like elements.

DETAILED DESCRIPTION

Figure 1A:
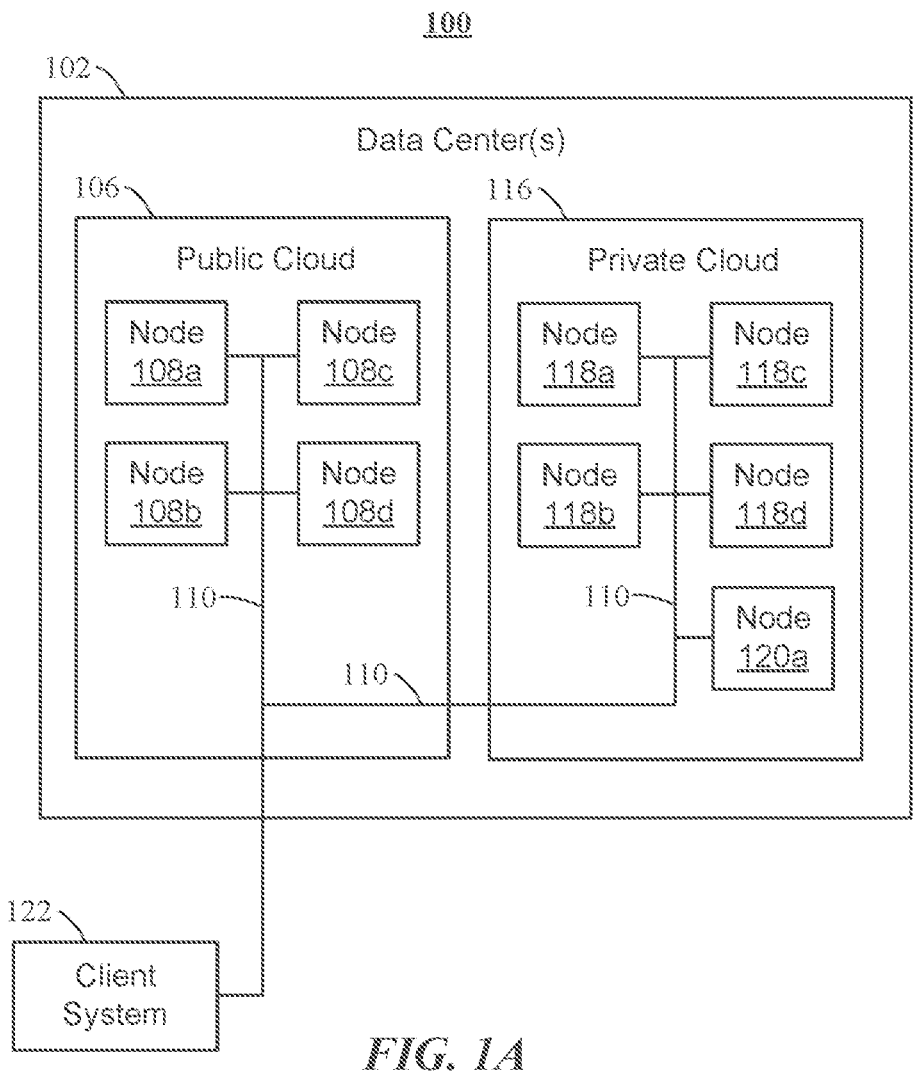
FIG. 1A illustrates an example Private Cloud as a Service (PCaaS) computing environment.

FIG. 1A illustrates an example Private Cloud as a Service (PCaaS) computing environment 100. PCaaS 100 may include a public cloud 106, a private cloud 116, and a client system 122. Public cloud 106 may be hosted in one or more data centers 102. The PCaaS computing environment 100 may provide for sharing of resources, such as application and data, between the public cloud 106 and the private cloud 116. Private cloud 116 may also be hosted in one or more data centers 102, which may be the same or different as the data centers) 102 in which public cloud 106 is hosted. Public cloud 106 may include server nodes 108a-d and may be, e.g., Microsoft Azure™ or the like. Private cloud 116 may include server nodes 118a-d and management server node 120a. The server nodes 108 of the public cloud 106 may be hosted in one or more data centers that are different from one or more data centers in which the server nodes 118 of the private cloud 116 are hosted. Alternatively, one or more server nodes 108 of the public cloud 106 may be hosted in the same data center as one or more server nodes 118 of the private cloud 116. Server nodes 108, 118, and 120 may be computer systems connected to each other by a network 110. Each of the server nodes 108, 118, 120 may have at least one processing unit, and may also have one or more storage devices, such as a disk drive, flash storage drive, or the like Private cloud 116 may be, e.g., VMware Cloud™ or the like. Each of the server nodes 108, 118, 120 may execute a hypervisor such as the VMware ESXi™ hypervisor, the Microsoft Hyper-V™ hypervisor, or any other suitable hypervisor. Each of the server nodes 108, 118 may use the hypervisor to execute virtual machines (VMs), operating systems, and software applications. Management node 120a in private cloud 116 may provide management services for the private cloud 116, e.g., resource management, VM management, VM deployment, task scheduling, statistics and logging, and server node management. Software that provides the management services may execute on management node 120a. The management services on management node 120a may be provided by the VMware vCenter Server® management platform, for example.

Although FIG. 1A illustrates a particular arrangement of server nodes in public cloud 106 and private cloud 116, this disclosure contemplates any suitable arrangement of server nodes in public cloud 106 and private cloud 116. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

The network 110 may include one or more network links. In particular embodiments, one or more links of the network 110 may include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)), or optical (such as, for example, Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links. The links need not necessarily be the same throughout PCaaS computing environment 100.

In particular embodiments, client system 122 may be an electronic device, including hardware, software, or embedded logic components or a combination of two or more such components and capable of carrying out the appropriate functionalities implemented or supported by client system 122. As an example and not by way of limitation, a client system 122 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 122 may enable a network user at client system 122 to access network 110. A client system 122 may enable its user to communicate with other users at other client systems 130.

Figure 1B:
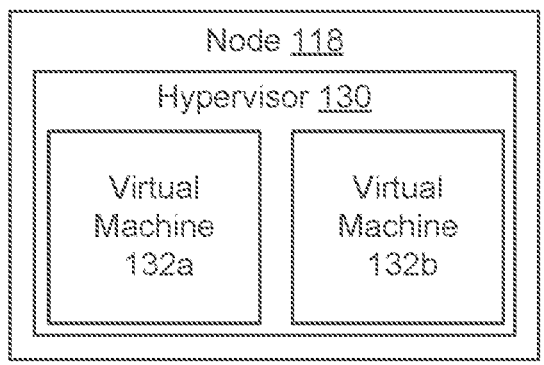
FIG. 1B illustrates an example server node.

FIG. 1B illustrates an example server node 118. The server node 118 may comprise a hypervisor 130. Hypervisor 130, e.g., VMware ESXi™ or the like, may create and manage one or more virtual machines, including 132a and 132b, on the server node 118. A virtual machine may execute an instance of an operating system (OS) and instances of one or more applications. Although two virtual machines 132a, 132b are shown, any suitable number of virtual machines 132 may be executed by hypervisor 130.

Figure 1C:
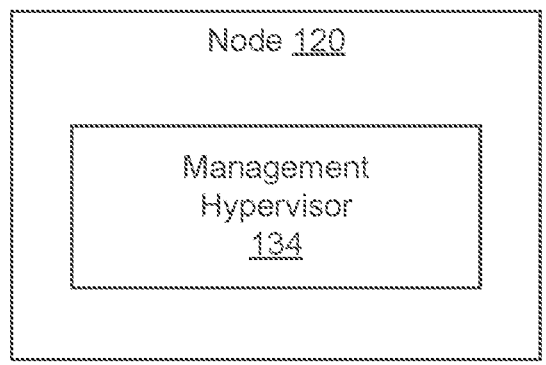
FIG. 1C illustrates an example management server node.

FIG. 1C illustrates an example management server node 120. Management server node 120 may comprise a management hypervisor 134. The management hypervisor 134, e.g., VMware ESXi™ or the like, may create and manage one or more virtual machines 132 for management components. The management components may execute in a VM 132 using the management hypervisor 134 on the management server node 120. As described above, management node 120 may provide management services for the private cloud 116, e.g. resource management, VM management, VM deployment, task scheduling, statistics and logging, and server node management. The management components may comprise VM ware vCenter Server®, VMware ESXi™, PCS, and DNS software components.

Figure 1D:
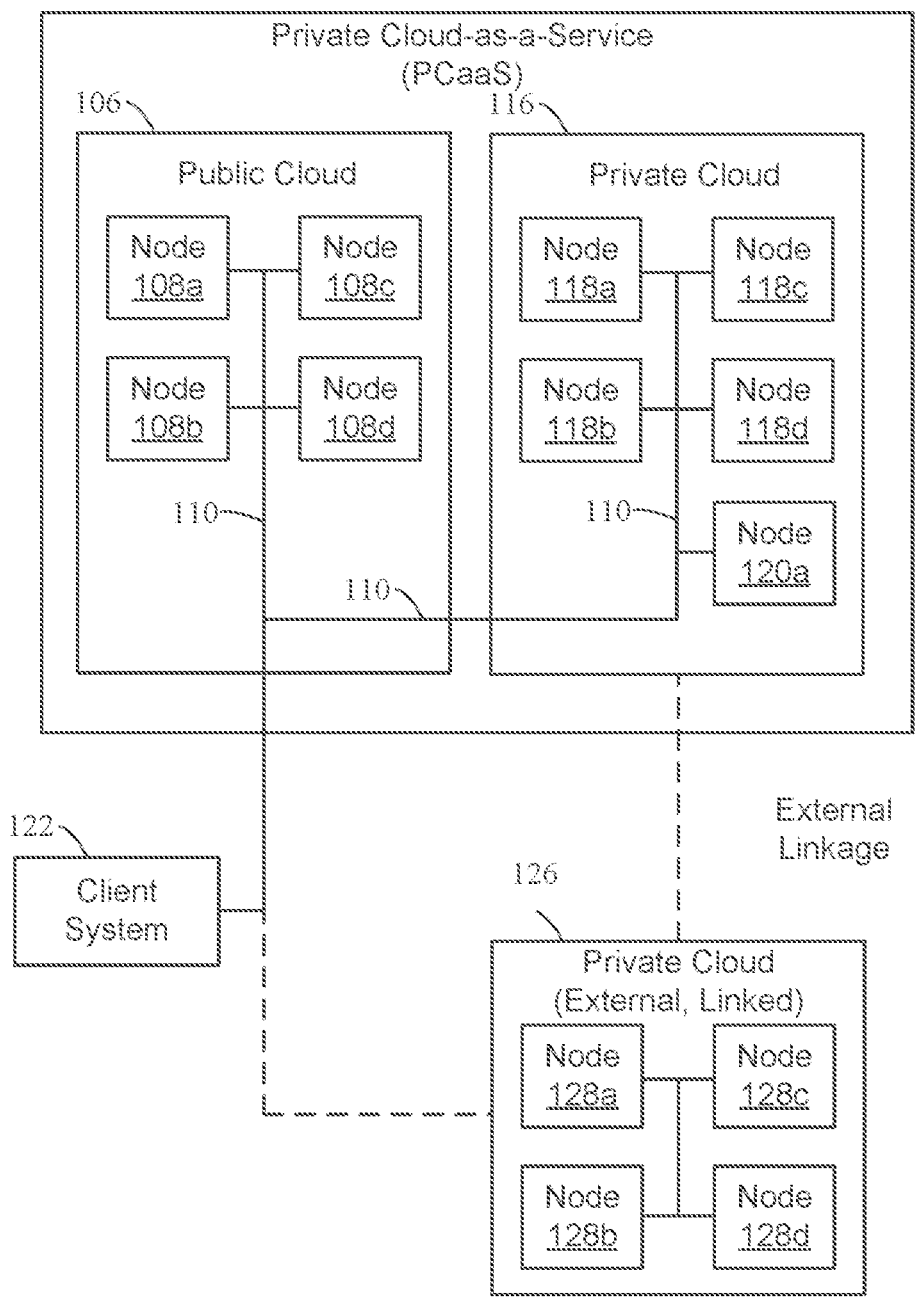
FIG. 1D illustrates an example architecture of PCaaS connected to an external private cloud.

FIG. 1D illustrates an example architecture of PCaaS connected to an external private cloud. In particular embodiments, the PCaaS computing environment 100 may have networking and management connectivity with one or more external private clouds 126 which are not hosted by the PCaaS provider. The external private cloud 126 may include server nodes 128a-128d. The configuration may be referred to as "Linked Mode". In Linked Mode, user accounts and credentials from external private cloud environments may be used to authenticate with the PCaaS private cloud, without requiring any explicit such accounts and credentials to be explicitly created in the PCaaS private cloud. Further, a singular interface served by management components on the external private cloud 126 and/or on the PCaaS private cloud 116 may be used to manage the external private cloud 126 as well as PCaaS private cloud 116. An external private cloud 126 may comprise a private cloud running in a customer-controlled environment, a PCaaS private cloud in the same location, or at another location, or a private cloud running in a manager provider-controlled environment, created and operated exclusively for a single consumer organization.

Figure 2:
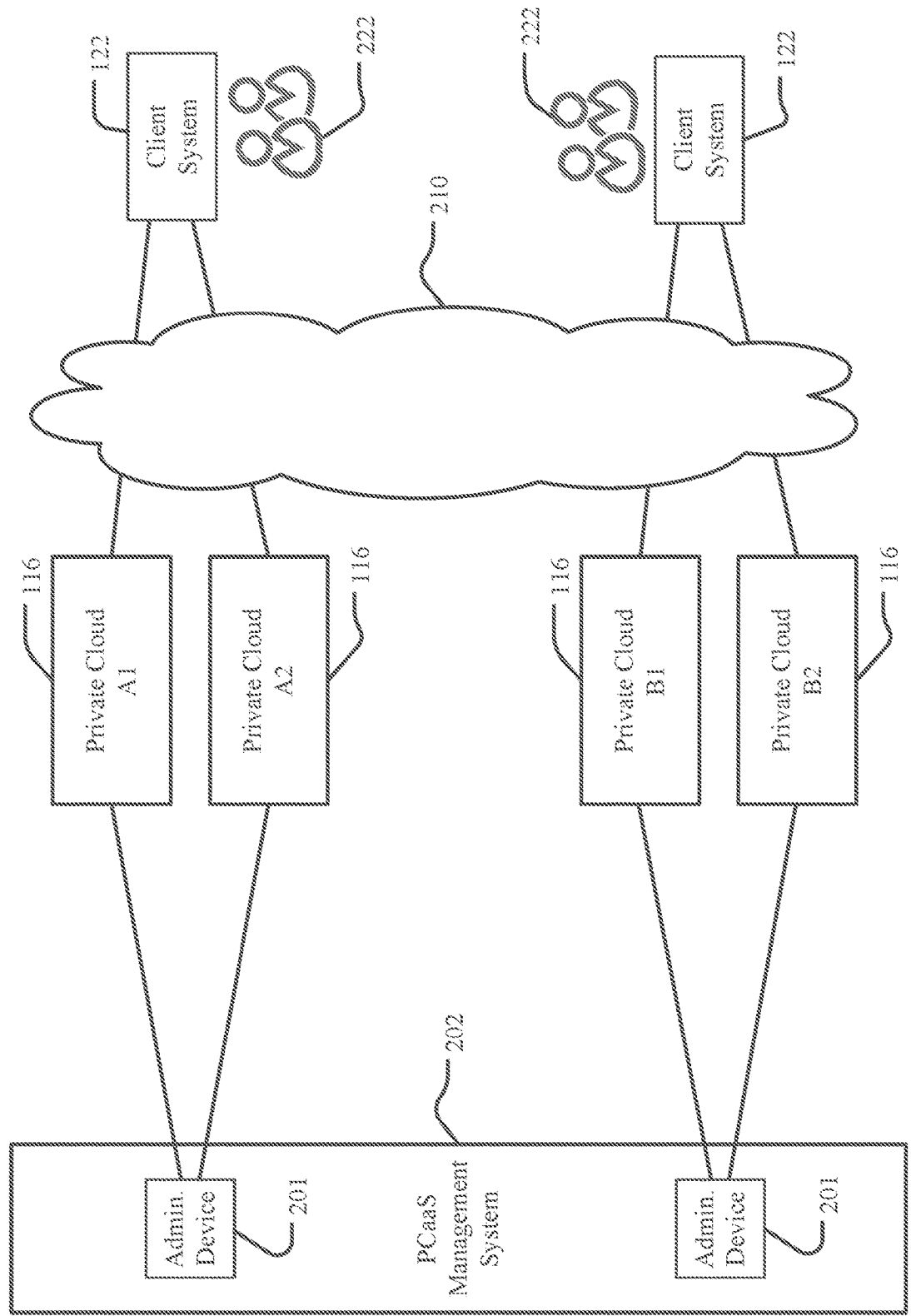
FIG. 2 illustrates an example access framework for a Private Cloud as a Service (PCaaS) computing environment.

FIG. 2 illustrates an example access framework for private clouds in a PCaaS computing environment. In particular embodiments, a computing device 201 associated with a cloud computing management system 201 may provide a computing environment comprising a plurality of user accounts. Each of the user accounts is assigned specified privileges to execute particular commands or programs. An automated software module running on a computing device 201 in the PCaaS management system 202 may have administrator privileges on the servers in private clouds 116. The automated software module may perform private cloud user account management, private cloud automated provisioning, private cloud automated monitoring and management. Tenant users 222 may access their corresponding private cloud 116 through one or more client systems 122. The connectivity to the private clouds may be provided through a public network 210. Tenant users 222 accessing the private cloud through one or more client systems 122 may have various privileges on the servers in their corresponding private cloud 116 based on their roles in the private cloud. For example, a tenant administrator user 222 may have full administrator privileges in the virtual machine instances in the private cloud. However, the tenant administrator user 222 may not have administrator privileges on the servers in the private cloud 116 such as node 118 or node 120. As an example and not by way of limitation, a tenant may add a user account to one of their private clouds. The computing device 201 in the PCaaS management system 202 may receive a request to create a user account for the new user. The request may comprise a user name, credentials, and roles of the user account within the private cloud. The computing device 201 may create a user account in the private cloud and assign privileges corresponding to the specified roles of the user account. The created user account may have different privileges within the private cloud 116. Although this disclosure describes managing user accounts in a private cloud in a particular manner, this disclosure contemplates managing user accounts in a private cloud in any suitable manner.

In particular embodiments, the computing device may receive a request to temporarily escalate privileges for a user account during a specified duration, where the user account is one of the plurality of user accounts. A tenant user 222 may need to perform a task that requires escalated privileges on one or more servers in the private cloud 116. The tenant user 222 may send a request to temporarily escalate privileges for her account for a specified amount of time. The request may comprise an identifier of the user account, requested privileges, and the specified duration. As an example and not by way of limitation, a tenant user 222 may decide to upgrade a software on a management server node 120 in a private cloud 116. Since the tenant user 222 does not have enough privileges to update the software on the management server node 120, the tenant user 222 may request a scheduled temporary escalation of privileges for her account by using a provided user interface. The user interface may generate a request to temporarily escalate privileges for the corresponding user account and send the request to the computing device 201 in the PCaaS management system 202. Although this disclosure describes receiving a request to temporarily escalate privileges for a user account during a specified duration in a particular manner, this disclosure contemplates receiving a request to temporarily escalate privileges for a user account during a specified duration in any suitable manner.

In particular embodiments, the computing device 201 may, on receiving a request to temporarily escalate privileges for a user account during a specified duration, determine whether the request is allowable or not. The computing device may, in response to the determination, grant the requested privileges for the specified duration in conjunction with specific restrictions on one or more prohibited activities that are normally permitted for user accounts with the requested privileges. The escalation of privileges may be temporarily granted to the user account so that the user corresponding to the user account can perform one or more allowed tasks. However, the escalated privileges may allow the user account to perform activities that should not normally be performed by the user account. The computing device 201 may have a list of those activities that are prohibited to the user account. In particular embodiments, the request may comprise an identifier for a task that needs to be performed by the user account during the specified duration. The computing device may evaluate whether the requested privileges are required to perform the task of the provided identifier and whether temporarily granting the requested privileges to the user account is allowable. The computing device may reject the request if the requested privileges are not required to perform the task or if temporarily granting the requested privileges to the one of the user accounts is not allowable. As an example and not by way of limitation, continuing with the prior example, the computing device 201 may receive a request to escalate privileges for a tenant administrator account for an hour. The computing device 201 may determine whether the request is allowable. The computing device 201 may grant the requested privileges to the tenant administrator account. The computing device 201 may also identify a list of prohibited activities for the tenant administrator account while the privileges of the tenant administrator are being escalated. As another example and not by way of limitation, the computing device 201 may receive a request to escalate privileges of a tenant administrator account for an hour. The request may also comprise 'upgrading a software' as a task identifier that identifies the task to be performed while the privileges of the tenant administrator account is being escalated. The computing device 201 may determine whether the requested privileges are required to upgrade a software and determine whether the temporary escalation of the privileges for the tenant administrator account is allowed. The computing device 201 may grant the requested privileges to the tenant administrator account if the computing device 201 determines that upgrading a software may require the requested privileges and the temporary escalation of the privileges for the tenant administrator account is allowed. The computing device 201 may also identify a list of prohibited activities for the tenant administrator account while the privileges of the tenant administrator are being escalated. Although this disclosure describes granting the requested privileges to a user account for the specified duration in a particular manner, this disclosure contemplates granting the requested privileges to a user account for the specified duration in any suitable manner.

In particular embodiments, the computing device 201 may, on receiving a request to temporarily escalate privileges for a user account during a specified duration, giant the requested privileges to the tenant administrator account. As an example and not by way of limitation, the computing device 201 may receive a request to escalate privileges for a tenant administrator account for an hour. The computing, device 201 may immediately escalate privileges for the tenant administrator account for an hour. Although this disclosure describes granting the requested privileges to a user account for the specified duration in a particular manner, this disclosure contemplates granting the requested privileges to a user account for the specified duration in any suitable manner.

In particular embodiments, the computing device 201 may start a timer for the specified duration upon granting the requested privileges to a user account. When the timer expires, the computing device 201 may restore privileges for the user account to the previous privileges assigned to the user account before the escalation of privileges. In particular embodiments, the computing device 201 may receive a notification that the user account has finished the intended tasks. The computing device 201 may cancel the timer and restore privileges for the user account to the previous privileges assigned to the user account before the escalation of privileges. In particular embodiments, the computing device may receive a request to extend the specified duration to an extended duration. The computing device may determine whether the request is allowable. The computing device may reset the timer for the extended duration if the computing device determined that the request is allowable. When the timer for the extended duration expires, the computing device 201 may restore privileges for the user account to the previous privileges assigned to the user account before the escalation of privileges. Although this disclosure describes running a timer for a duration of the escalation of privileges in a particular manner, this disclosure contemplates running a timer for a duration of the escalation of privileges in any suitable manner.

Figure 3:
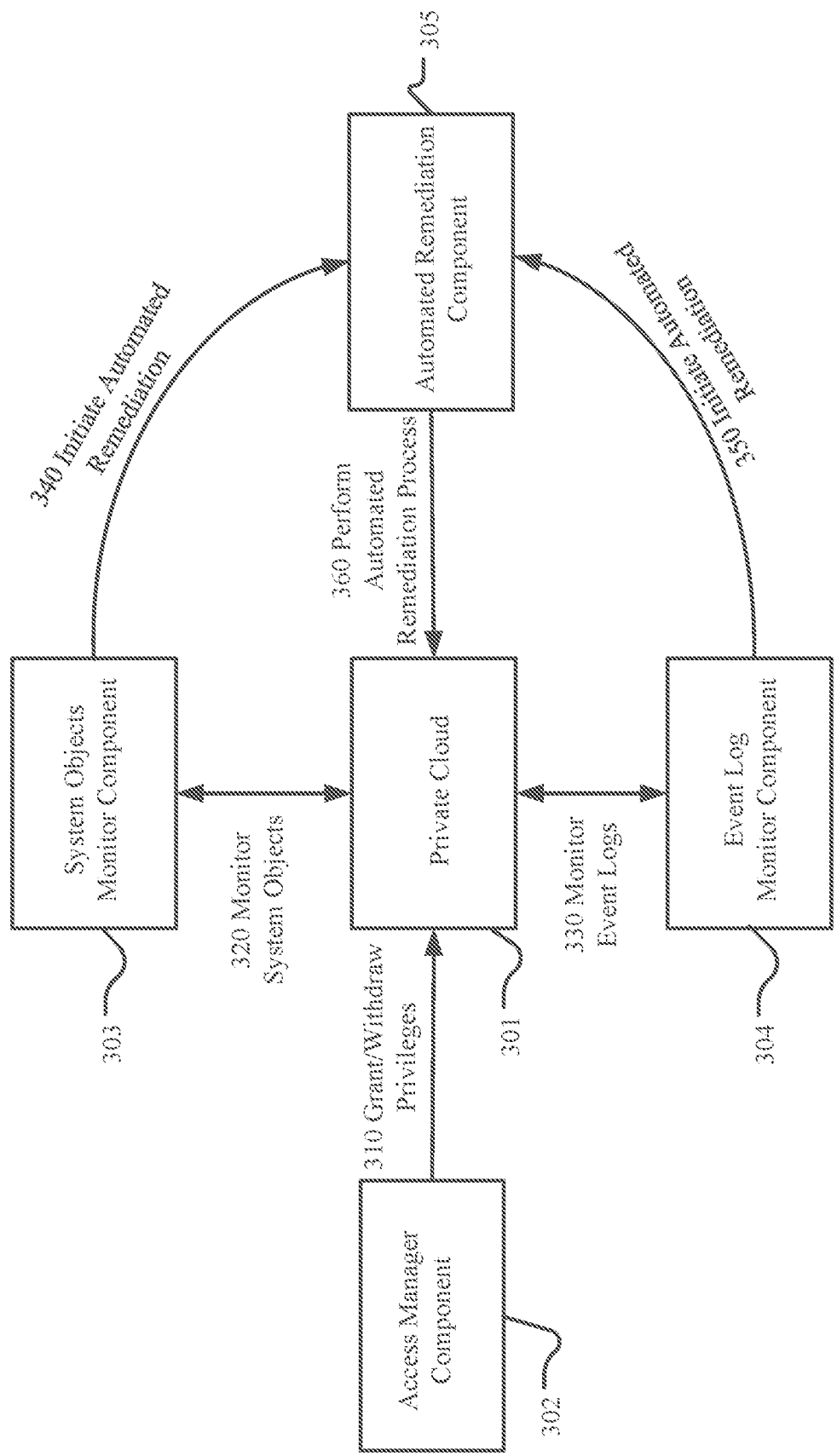
FIG. 3 illustrates an example diagram for PCaaS management system functionalities during an escalation of privileges for a tenant user account.

FIG. 3 illustrates an example diagram for PCaaS management system functionalities during an escalation of privileges for a tenant user account. In particular embodiments, the computing device 201 may decide to grant escalated privileges to a tenant user account for a specified duration in conjunction with specific restrictions on one or more prohibited activities that are normally permitted for user accounts with the requested privileges. An access manager component 302 may determine what access privileges should be granted to the tenant user account. The access manager component 302 may grant the determined access privileges to the tenant user account as illustrated in step 310. Since the tenant user account is valid on a private cloud 301, the granted access privileges are effective on the private cloud 301. The private cloud 301 may comprise one or more server nodes 118 or one or more management server nodes 120. As an example and not by way of limitation, a tenant administrator user 222 may want to install a new software on the cloud management server node 120. The access manager component 302 may grant the host administrator privileges in the private cloud 301 to the tenant administrator user account as illustrated in step 310. Although this disclosure describes granting access privileges in a private cloud to a tenant user account in a particular manner, this disclosure contemplates granting access privileges in a private cloud to a tenant user account in any suitable manner.

In particular embodiments, the computing device 201 may, during the specified duration, monitor for any indication that the user account has attempted a prohibited activity by monitoring specified objects and analyzing event logs. An indication that the user account attempted each of the prohibited activities may be pre-defined. Each indication may signify that the user account touched one of the specified objects or that the user account generated a particular event. In particular embodiments, the computing device 201 may, in order to monitor the specified objects, schedule a periodic job of inspecting the specified objects. A system object monitor component 303 may perform the scheduled periodic job by monitoring one or more specified system objects on the one or more target server nodes at a given interval as illustrated in step 320. The computing device 201 may determine the interval for the periodic job such that the indication can be detected with a delay less than a threshold. The computing device 201 may detect an indication that the one of the user accounts touched one of the specified objects if the one of the specified objects was modified by the one of the user accounts. In particular embodiments, the computing device 201 may, in order to analyze the event logs, schedule a periodic job of analyzing the event logs. An event log monitor component 304 may perform scheduled periodic job by monitoring one or more system event logs on the one or more target server nodes at a given interval as illustrated in step 330. The computing device 201 may determine the interval for the periodic job such that the indication can be detected with a delay less than a threshold. The computing device may detect an indication that the user account generated a particular event if the event logs contain one or more records for the particular event. As an example and not by way of limitation, continuing with a prior example, the access manager component 302 granted the host administrator privileges on the cloud management server node 120 to the tenant administrator user account because the tenant administrator user wanted to install a new software on the cloud management server node 120. The computing device 201 in the PCaaS management system 202 may schedule a periodic job to monitor a list of system configuration files on the cloud management server node 120. The system objects monitor component 303 may monitor the list of system configuration files on the cloud management server node 120 at the given interval as illustrated in step 320. The computing device 201 may also schedule a periodic job to monitor a list of event logs on the cloud management server node 120. Based on the scheduled job, the event log management component 304 may monitor the list of event logs on the cloud management serve node 120 at the given interval. Although this disclosure describes scheduling periodic jobs to monitor system objects and event logs on the target server node in a particular manner, this disclosure contemplates scheduling periodic jobs to monitor system objects and event logs on the target server node in any suitable manner.

In particular embodiments, the computing device 201 may, on detecting an indication that the user account attempted one of the prohibited activities, initiate an automated remediation corresponding to the indication In particular embodiments, the system objects monitor component 303 may detect that the user account with the escalated privileges touched one of the specified objects while the system objects monitor component 303 monitors the specified objects. The system objects monitor component 303 may initiate an automated remediation as illustrated at step 340 by sending an indication to an automated remediation component 305. The indication may comprise the identifier of the user account, the identifier of the one of the system objects that was touched, and descriptions of the changes. On receiving the indication, the automated remediation component 305 may perform one or more automated remediation processes. A default automated remediation may comprise providing alerts to one or more registered system administrators. In addition to providing alerts to one or more registered system administrators, the automated remediation components 305 may perform one or more automated remediation processes corresponding to the indication as illustrated at step 360. The one or more automated remediation processes may comprise rolling back the unauthorized changes. In particular embodiments, the event log monitor component 304 may detect that the user account with the escalated privileges generated a particular event while the event log monitor component 304 monitors the one or more specified event logs. The event log monitor component 304 may initiate an automated remediation as illustrated at step 350 by sending an indication to an automated remediation component 305. The indication may comprise the identifier of the user account, the identifier of the particular event the user account generated. On receiving the indication, the automated remediation component 305 may perform one or more automated remediation processes. A default automated remediation may comprise providing alerts to one or more registered system administrators. In addition to providing alerts to one or more registered system administrators, the automated remediation components 305 may perform one or more automated remediation processes corresponding to the indication as illustrated at step 360 The one or more automated remediation processes, if possible, may comprise rolling-back the unauthorized changes associated with the particular event. The one or more automated remediation processes may not be performed in some cases (e.g., when the account the management system uses to communicate with the private cloud has been deleted or modified in such a way that the privileges thereof have been lowered.) Although this disclosure describes initiating an automated remediation corresponding to an indication on detecting the indication that the user account attempted one of the prohibited activities in a particular manner, this disclosure contemplates initiating an automated remediation corresponding to an indication on detecting the indication that the user account attempted one of the prohibited activities in any suitable manner.

In particular embodiments, the computing device 201 may detect an indication that the user account generated a particular event, where the particular event comprises creating a new administrator account. The event log monitor component 304 may detect that the user account with the escalated privileges generated a new administrator account while the event log monitor component 304 monitors and analyzes the event logs. The event log monitor component 304 may initiate an automated remediation as illustrated at step 350 by sending an indication that the user account with the escalated privileges has generated a new administrator account to the automated remediation component 305. The indication may also comprise an identifier of the generated new administrator account. The automated remediation component 305 may send alerts to one or more registered system administrators. The automated remediation component 305 may also perform an automated remediation process corresponding to the indication as illustrated at step 360, which may comprise deleting the generated new administrator account. Although this disclosure describes performing an automated remediation process corresponding to an indication that the user account created a new administrator account in a particular manner, this disclosure contemplates performing an automated remediation process corresponding to an indication that the user account created a new administrator account in any suitable manner.

In particular embodiments, the computing device 201 may detect an indication that the user account generated a particular event, where the particular event comprises lowering privileges of a system account. The event log monitor component 304 may detect that the user account with the escalated privileges lowered privileges of a system account while the event log monitor component 304 monitors and analyzes the event logs. The event log monitor component 304 may initiate an automated remediation as illustrated at step 350 by sending an indication that the user account with the escalated privileges has lowered privileges of a system account to the automated remediation component 305. The indication may also comprise an identifier of the impacted system account. The automated remediation component 305 may send alerts to one or more registered system administrators. The automated remediation component 305 may also perform an automated remediation process corresponding to the indication as illustrated at step 360, which may comprise restoring the lowered privileges of the impacted system account. Although this disclosure describes performing an automated remediation process corresponding to an indication that the user account lowered privileges of a system account in a particular manner, this disclosure contemplates performing an automated remediation process corresponding to an indication that the user account lowered privileges of a system account in any suitable manner.

In particular embodiments, the computing device 201 may detect an indication that the user account generated a particular event, where the particular event comprises deleting another administrator account. The event log monitor component 304 may detect that the user account with the escalated privileges deleted an administrator account while the event log monitor component 304 monitors and analyzes the event logs. The event log monitor component 304 may initiate an automated remediation as illustrated at step 350 by sending an indication that the user account with the escalated privileges has deleted an administrator account to the automated remediation component 305. The indication may also comprise an identifier of the deleted administrator account. The automated remediation component 305 may send alerts to one or more registered system administrators. The automated remediation component 305 may also perform an automated remediation process corresponding to the indication as illustrated at step 360, which may comprise re-creating the deleted administrator account with identical privileges as before. Although this disclosure describes performing an automated remediation process corresponding to an indication that the user account deleted an administrator account in a particular manner, this disclosure contemplates performing an automated remediation process corresponding to an indication that the user account deleted an administrator account in any suitable manner.

In particular embodiments, the computing device 201 may detect an indication that the user account touched one of the specified objects, where the specified objects comprise one or more system configuration files. The system objects monitor component 303 may detect that the user account with the escalated privileges modified one or more system configuration files while the system objects monitor component 303 periodically monitors a list of system files. The system objects monitor component 303 may initiate an automated remediation as illustrated at step 340 by sending an indication that the user account with the escalated privileges has modified one or more system configuration files to the automated remediation component 305. The indication may also comprise identifiers of the modified system configuration files. The automated remediation component 305 may send alerts to one or more registered system administrators. The automated remediation component 305 may also perform an automated remediation process corresponding to the indication as illustrated at step 360, which may comprise restoring the one or more system configuration files to their previous states. In order to make the restoring possible, the computing device 201 may back up the list of system files before the computing device 201 grants the requested privileges. Although this disclosure describes performing an automated remediation process corresponding to an indication that the user account modified one or more system configuration files in a particular manner, this disclosure contemplates performing an automated remediation process corresponding to an indication that the user account modified one or more system configuration files in any suitable manner.

In particular embodiments, the PCaaS private cloud 116 may have more than one additional management components configured or installed in the environment. In this context, when privileges are escalated, the system may escalate privileges concurrently for one or more of the additional management components. As an example and not by way of limitation, in a VMware vSphere based PCaaS private cloud, VMware vCenter is a default and required management component. A particular customer configuration may optionally include VMware vRealize Operations (vROps) as an add-on component installed and managed by the PCaaS provider. When a customer requests escalation of privileges, the customer may desire escalation of privileges on VMware vCenter, but the customer may also desire, optionally, to enable escalation of privileges on vROps as well. When the PCaaS private cloud 116 has N installed management components, a customer may request escalation of privileges for 2N−1 possible component combinations of management components. Although this disclosure describes escalating privileges for multiple management components in a particular manner, this disclosure contemplates escalating privileges for multiple management components in any suitable manner.

In particular embodiments, the PCaaS private cloud 116 may be linked with one or more external private clouds 126 a "Linked Mode" configuration. In such configurations, users may have privileges distinct from the default privilege level of the PCaaS private cloud. As an example and not by way of limitation, a user account may have complete administrative access to an on-premises private cloud 126, which is linked with the PCaaS private cloud 116. The user account may have restricted permissions in the PCaaS private cloud 116. Thus, upon establishment of the "Linked Mode", the privilege level of the user account may be lowered. Subsequently, the user may request elevation of privilege levels. Although this disclosure describes managing privilege level of a user account in a Linked Mode in a particular manner, this disclosure contemplates managing privilege level of a user account in a Linked Mode in any suitable manner.

Figure 4:
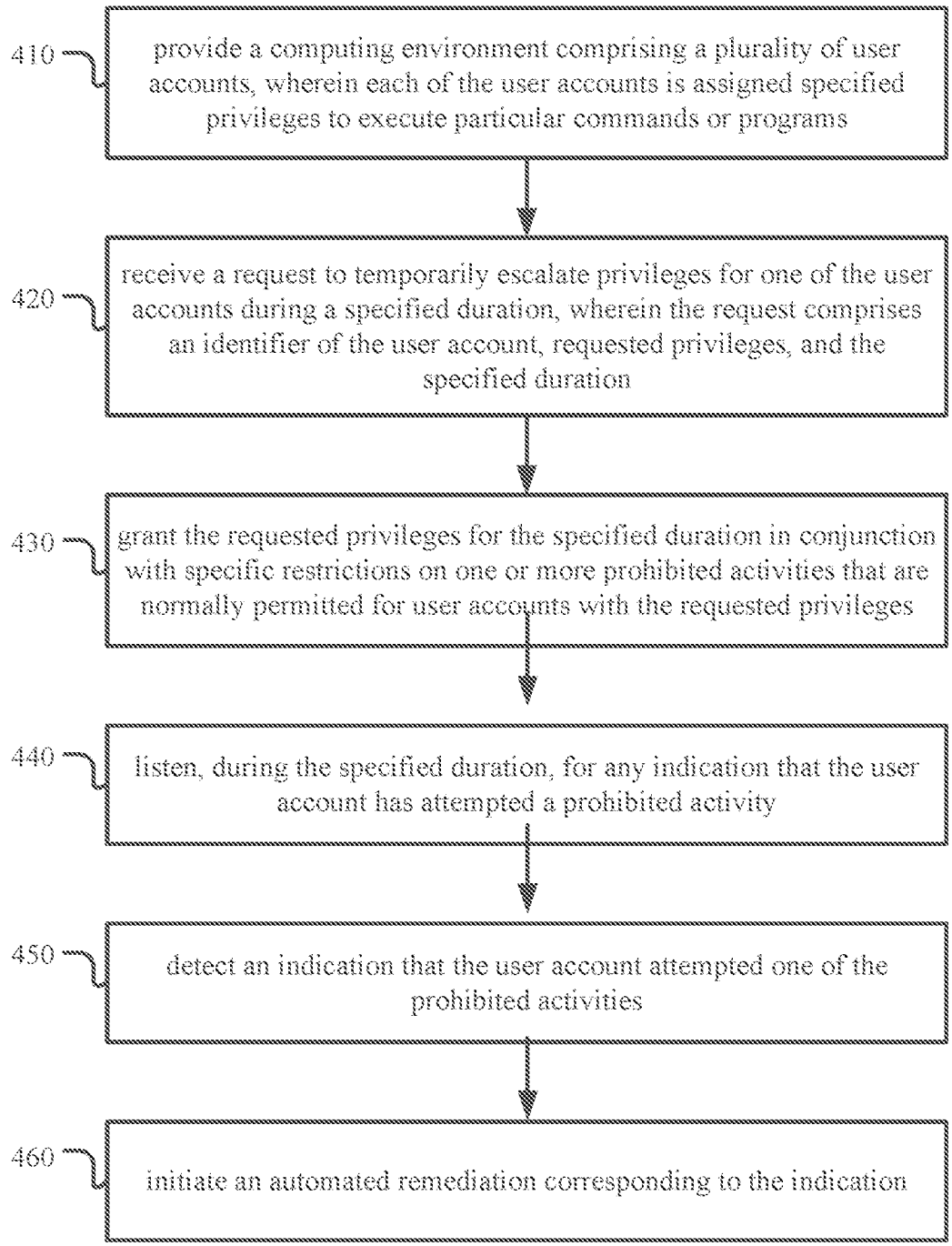
FIG. 4 illustrates example interactions that may occur when a private cloud-management service creates a private-cloud virtual machine that is accessible in a public cloud via a resource manager.

FIG. 4 illustrates an example method 400 for temporarily escalating privileges for a user account. The method may begin at step 410, where the computing device 201 may provide a computing environment comprising a plurality of user accounts, wherein each of the user accounts is assigned specified privileges to execute particular commands or programs. At step 420, the computing device 201 may receive a request to temporarily escalate privileges for one of the user accounts during a specified duration, wherein the request comprises an identifier of the user account, requested privileges, and the specified duration. At step 430, the computing device 201 may grant the requested privileges for the specified duration in conjunction with specific restrictions on one or more prohibited activities that are normally permitted for user accounts with the requested privileges. At step 440, the computing device 201 may monitor, during the specified duration, for any indication that the user account has attempted a prohibited activity. At step 450, the computing device 201 may detect an indication that the user account attempted one of the prohibited activities. At step 460, the computing device 201 may initiate an automated remediation corresponding to the indication. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for temporarily escalating privileges for a user account including the particular steps of the method of FIG. 4, this disclosure contemplates any suitable method for temporarily escalating privileges for a user account including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
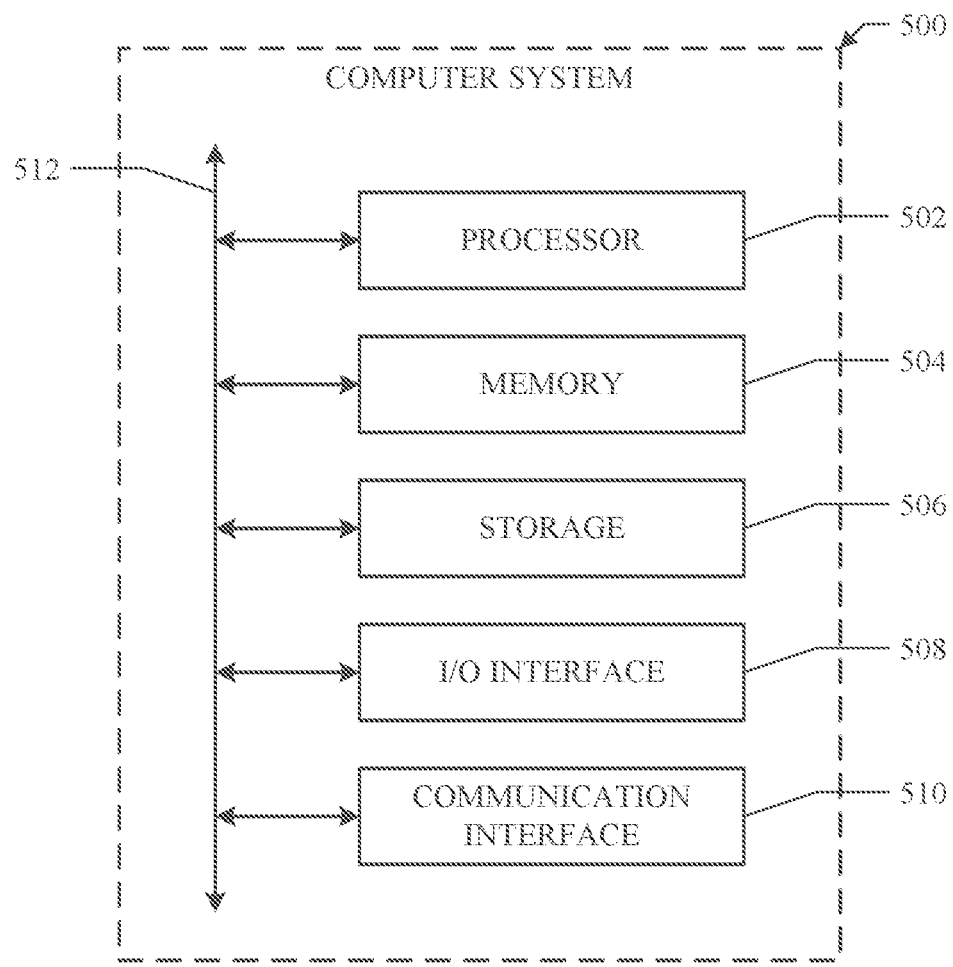
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein, in particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (FDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers, or reside in a cloud, which may include one or more cloud components in one or more networks Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor, or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interlaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interlace 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein. "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method when executed on data processing hardware causes the data processing hardware to perform operations comprising:
   receiving, from a user of a user account, a request to temporarily escalate privileges of the user account to permit access to a plurality of resources in a distributed computing environment, the request comprising a duration specified by the user for the privileges to be escalated, the temporarily escalated privileges greater than current privileges assigned to the user account;
   granting the temporarily escalated privileges to the user account, the temporarily escalated privileges comprising a restriction prohibiting the user account from performing an activity using one of the plurality of resources, the activity normally permitted for user accounts comprising the temporarily escalated privileges;
   during the specified duration while the temporarily escalated privileges are granted to the user account, detecting a user generated particular event from the user account;
   determining that the user generated particular event detected from the user account comprises an attempt by the user account to perform the activity prohibited by the restriction of the temporarily escalated privileges using the one of the plurality of resources; and
   in response to detecting the attempt by the user account to perform the activity prohibited by the restriction, sending an alert to a registered administrator of the plurality of resources.

2. The computer-implemented method of claim 1, wherein the operations further comprise, upon granting the temporarily escalated privileges, starting a timer set to expire after an amount of time equal to the specified duration.

3. The computer-implemented method of claim 2, wherein the operations further comprise, prior to expiration of the timer:
   receiving an extension request to extend the specified duration to an extended duration;
   determining whether the extension request is allowable; and
   when the extension request is allowable, setting the expiration of the timer to an amount of time equal to the extended duration.

4. The computer-implemented method of claim 1, wherein the operations further comprise, in response to detecting the attempt by the user account to perform the activity prohibited by the restriction, revoking the temporarily escalated privileges for the user account.

5. The computer-implemented method of claim 1, wherein detecting the attempt by the user account to perform the activity prohibited by the restriction of the temporarily escalated privileges is based on:
   monitoring specified objects; and
   analyzing event logs.

6. The computer-implemented method of claim 5, wherein analyzing the event logs comprises:
   scheduling a periodic job of analyzing the event logs; and
   when the event logs contain one or more records of the activity prohibited by the restriction, generating an indication that the user account attempted to perform the activity prohibited by the restriction of the temporarily escalated privileges using the one of the plurality of resources.

7. The computer-implemented method of claim 6, wherein monitoring the specified objects comprises scheduling a periodic job of inspecting the specified objects.

8. The computer-implemented method of claim 7, wherein an interval of the periodic job is determined such that the indication can be detected with a delay less than a threshold.

9. The computer-implemented method of claim 1, wherein the activity prohibited by the restriction comprises creating a new registered administrator.

10. The computer-implemented method of claim 1, wherein the activity prohibited by the restriction comprises deleting another registered administrator.

11. A system comprising:
    data processing hardware; and
    memory hardware in communication with the data processing hardware, the memory hardware storing instructions that when executed on the data processing hardware cause the data processing hardware to perform operations comprising:
       receiving, from a user of a user account, a request to temporarily escalate privileges to permit access to a plurality of resources in a distributed computing environment, the request comprising a duration specified by the user for the privileges to be escalated, the temporarily escalated privileges greater than current privileges assigned to the user account;
       granting the temporarily escalated privileges to the user account, the temporarily escalated privileges comprising a restriction prohibiting the user account from performing an activity using one of the plurality of resources, the activity normally permitted for user accounts comprising the temporarily escalated privileges;
       during the specified duration while the temporarily escalated privileges are granted to the user account, detecting a user generated particular event from the user account;
       determining that the user generated particular event detected from the user account comprises an attempt by the user account to perform the activity prohibited by the restriction of the temporarily escalated privileges using the one of the plurality of resources; and in response to detecting the attempt by the user account to perform the activity prohibited by the restriction, sending an alert to a registered administrator of the plurality of resources.

12. The system of claim 11, wherein the operations further comprise, upon granting the temporarily escalated privileges, starting a timer set to expire after an amount of time equal to the specified duration.

13. The system of claim 12, wherein the operations further comprise, prior to expiration of the timer:

receiving an extension request to extend the specified duration to an extended duration;

determining whether the extension request is allowable; and when the extension request is allowable, setting the expiration of the timer to an amount of time equal to the extended duration.

14. The system of claim 11, wherein the operations further comprise, in response to detecting the attempt by the user account to perform the activity prohibited by the restriction, revoking the temporarily escalated privileges for the user account.

15. The system of claim 11, wherein detecting the attempt by the user account to perform the activity prohibited by the restriction of the temporarily escalated privileges is based on:

monitoring specified objects; and analyzing event logs.

16. The system of claim 15, wherein analyzing the event logs comprises:

scheduling a periodic job of analyzing the event logs; and when the event logs contain one or more records of the activity prohibited by the restriction, generating an indication that the user account attempted to perform the activity prohibited by the restriction of the temporarily escalated privileges using the one of the plurality of resources.

17. The system of claim 16, wherein monitoring the specified objects comprises scheduling a periodic job of inspecting the specified objects.

18. The system of claim 17, wherein an interval of the periodic job is determined such that the indication can be detected with a delay less than a threshold.

19. The system of claim 11, wherein the activity prohibited by the restriction comprises creating a new registered administrator.

20. The system of claim 11, wherein the activity prohibited by the restriction comprises deleting another registered administrator.

* * * * *